Nov. 27, 1956  G. WINKLER  2,771,754
DISHES OR PLATES
Filed May 27, 1954
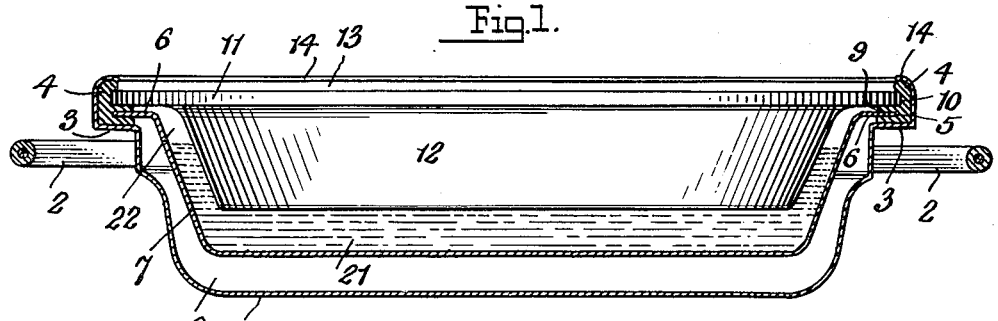
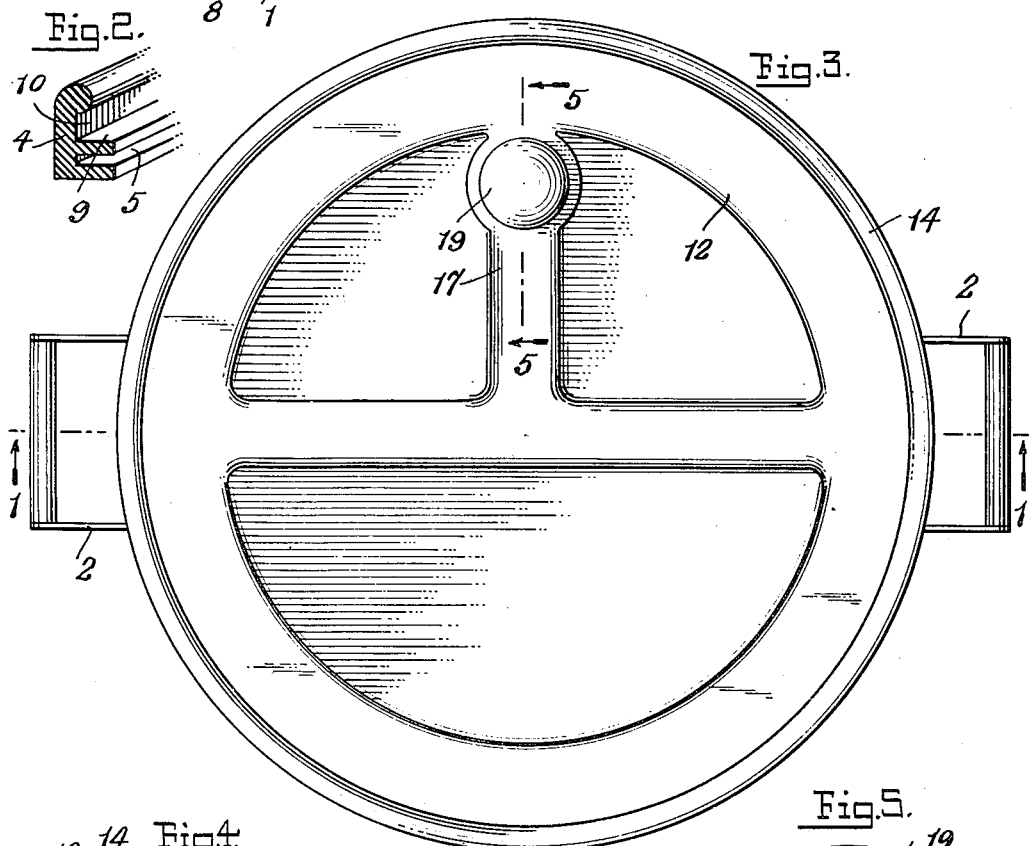
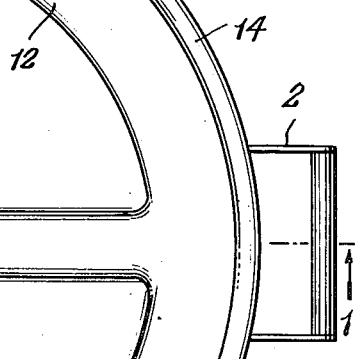
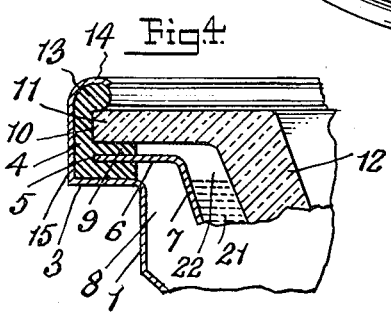
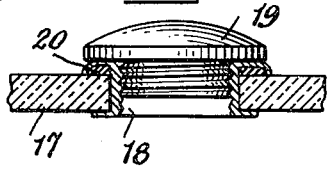
INVENTOR
Gilbert Winkler
BY
Fritz Zeegle
ATTORNEY

United States Patent Office 2,771,754
Patented Nov. 27, 1956

2,771,754

DISHES OR PLATES

Gilbert Winkler, West Englewood, N. J.

Application May 27, 1954, Serial No. 432,737

6 Claims. (Cl. 65—15)

This invention relates to plates or dishes, and more particularly to the type by which the food or other contents of the dish are warmed or maintained at a desired temperature by means of hot or warm water contained in a chamber provided in the dish.

Dishes or plates of this character, as known at the present time, generally consist of inner and outer shells held in spaced relation to produce an air chamber between them, and in a food-holding plate member spaced from the inner shell to thereby provide a water-holding chamber between it and said shell. It is an object of the present invention to provide such a dish or plate with improved means for holding together the several elements of the dish, namely, the inner and outer shells and the food-holding plate member; to provide such means in a manner to prevent leakage of the water; to provide means by which the water chamber can be easily filled and emptied, and preventing the possibility of the food contents of the plate from reaching the heating water or vice versa.

It is still another object of the invention to provide a plate or dish of a construction which will facilitate the assembly of its various parts, and which will have numerous other advantages apparent to those skilled in this art.

With these and other objects to be hereinafter set forth in view, I have devised the arrangement of parts to be described and more particularly pointed out in the claims appended hereto.

In the accompanying drawing, wherein an illustrative embodiment of the invention is disclosed, Fig. 1 is a vertical sectional view through a dish or plate constructed in accordance with the invention, the section being taken substantially on the line 1—1 of Fig. 3, looking in the direction of the arrows, the food-holding plate member being shown in full lines rather than in section;

Fig. 2 is a sectional view in perspective, of a part of the gasket employed at the top or rim of the dish;

Fig. 3 is a top plan view of the dish;

Fig. 4 is an enlarged sectional view through the upper edge or rim of the dish, and Fig. 5 is a sectional view, taken substantially on the line 5—5 of Fig. 3, looking in the direction of the arrows.

Referring to the drawing, 1 indicates the bottom or outer shell of the dish or plate. The same is preferably formed from sheet metal and is provided at diametrically opposite locations with handles 2 by means of which the dish can be conveniently handled or carried. Adjacent to its upper edge, the outer shell 1 is laterally flanged, as indicated at 3 to form a horizontally disposed, annular seat for the reception of the gasket shown at 4. Said gasket, shown in detail in Figs. 2 and 4, can be composed of rubber, synthetic rubber, plastic or other suitable soft, heat-resistant material, and is formed with a lower, annular slot or groove 5 which receives the radial flange 6 formed on and extending laterally from the inner shell indicated at 7. When the inner shell 7 is fitted in position within and spaced from the outer shell 1 and with its flange 6 located in the slot 5 of the gasket 4, the inner shell 7 will be spaced from the outer shell 1 as indicated by the spacing 8, which spacing forms an air chamber serving to insulate the outer shell 1 from the inner shell 7.

Located above the slot 5 in the gasket 4, and separated therefrom by the strip 9, is a groove 10 which conforms to and in which is fitted the rim 11 of the food-holding member 12 or plate proper of the dish. Disposed over the top of the rim 11 is a rounded bead 13, formed as an upper integral part of the gasket 4, and the rim 11 of the plate member 12 is confined between this bead and the strip 9 of the gasket.

The gasket 4 is maintained on its seat 3 by means of the rolled-over or inbent flange 14 formed on the upward annular extension or wall portion 15 which projects integrally upwardly from the flange 3.

The plate member 12 may be made of crockery or ceramic material, or might possibly be made of plastic or other suitable substance, and in the form shown it is of the compartment type, although this is not essential to the present invention. Provided in one of the vertical partitions 17 of the plate member 12 is the filler opening, which is fitted with an internally-threaded bushing 18 adapted to threadably receive a closure plug 19 and normally close the filler opening. A gasket 20 may be interposed between the bushing 18 and the wall 17 to prevent leakage at this point.

From the foregoing, the structure and operation of the improved dish or plate will be readily understood. The novel type of gasket employed at 4, holds the rim 11, the flange 6 and maintains these elements and the seat 3 in spaced relation and insures no leakage between these parts. In assembling the parts, the inner shell 7 and the plate member 12 can be fitted in the gasket 4 and the gasket, carrying these parts, is then placed on the seat 3, whereupon the flange 14 is rolled or inbent over the top of the bead 13 on the gasket and the gasket is thus permanently held on the seat 3.

The water 21 for heating the food or other contents of the plate member 12 is poured into the chamber 22 through the filler opening and the same, being thus maintained in contact with the under side of the plate member 12, will keep the contents of the plate member at the required temperature. At the same time, the inner shell 7, which becomes hot through contact with the water 21, will not transfer its heat to the outer shell 1 because of the intervening air space 8. Thus, the outer shell 1 will remain cool to the touch despite the high temperature of the water and the inner shell 7 with which it contacts. The heated water can be readily emptied out through the filler opening by removal of the threaded plug 19.

The parts can be easily assembled, leakage of the water will not occur, and the plate or dish is easily washed to keep it clean and sanitary.

Having described a single embodiment of the invention, it is obvious that the same is not to be restricted thereto, but is broad enough to cover all structures coming within the scope of the annexed claims.

What I claim is:

1. A dish of the character described comprising an outer shell, an inner shell located within the same and spaced from the outer shell, a gasket seated at the upper end of the outer shell, said gasket having a groove receiving an edge of the inner shell and holding the same spaced from the outer shell, and a food-holding plate member, the gasket having a groove for receiving the rim of said plate member and holding the same spaced from the inner shell.

2. A dish of the character described comprising, an outer shell provided with an annular seat adjacent to its upper end, a gasket resting on said seat, an annular wall extending vertically from the seat and extending around the gasket, the top of said wall being inturned to overlie the top of the gasket and hold the same on its seat, an inner shell located within and spaced from the outer shell, a food-holding plate member located within and spaced from the inner shell, the gasket being provided with spaced grooves in its inner side for the respective reception of edge portions of the plate member and inner shell to thereby hold these edge portions in spaced relationship.

3. A dish of the character described comprising, an outer shell provided with an annular seat adjacent to its upper end, a gasket resting on said seat, an annular wall extending vertically from the seat and extending around the outside of the gasket, the top of said wall being inturned to overlie the top of the gasket and hold the same on its seat, an inner shell located within and spaced from the outer shell, a food-holding plate member located within and spaced from the inner shell, the inner shell having a radial flange, the plate member having a rim, the gasket being provided with spaced grooves in its inner side for the respective reception of the rim of the plate member and the flange of the inner shell to hold these parts in spaced relationship and prevent leakage between them.

4. A dish of the character described comprising, an outer shell, an inner shell fitted within and spaced therefrom, a food-holding plate fitted within and spaced from the inner shell, a gasket supported by the upper edge portions of the outer shell and provided with channels for respectively engaging the edges of the inner shell and said plate and holding said edges in spaced relation, an inturned flange at the top of the outer shell extending over and holding the gasket against shifting movement, the plate and inner shell being spaced apart to provide a water-holding chamber between them, and a filler opening through the plate allowing access to said chamber.

5. A dish comprising, an outer shell, an inner shell within the same, a plate within the inner shell, a seat on the rim of the outer shell, and a gasket mounted on said seat and formed with spaced annular grooves to receive edge portions of the plate and inner shell to thereby hold these parts in fixed, spaced relationship.

6. In a dish of the character described, an outer metal shell provided at its upper edge with a radially-extending horizontal flange formed at its outer edge with an upstanding wall extending circumferentially of the shell, a gasket seated on the flange, the upper end of the wall being inturned to thereby maintain the gasket seated on the flange, the gasket having a pair of spaced grooves facing toward the inside of the outer shell, an inner shell fitted within the outer shell and spaced therefrom to thereby provide an air space between the shells, the inner shell having a radial flange extending into one of the grooves in the gasket, a food-receiving plate having an edge portion fitted into the second groove in the gasket to thereby hold the plate above and spaced from the inner shell and to provide a water-receiving chamber between the plate member and inner shell, the plate having an opening through which access to said water-holding chamber is had, and parts of the gasket extending between and separating marginal edge portions of the outer shell, inner shell and said plate to thereby heat-insulate these portions from one another.

References Cited in the file of this patent

UNITED STATES PATENTS

| | | |
|---|---|---|
| 12,876 | Stimpson | May 15, 1855 |
| 605,071 | Benson | June 7, 1898 |
| 1,881,873 | Newcomb | Oct. 11, 1932 |
| 2,207,325 | Maersch | July 9, 1940 |
| 2,367,409 | Kuhler | Jan. 16, 1945 |
| 2,545,733 | Hatfield | Mar. 20, 1951 |
| 2,591,151 | Hansen et al. | Apr. 1, 1952 |
| 2,593,868 | Fowler | Apr. 22, 1952 |

FOREIGN PATENTS

| | | |
|---|---|---|
| 92,685 | Austria | Mar. 25, 1923 |
| 830,881 | France | May 23, 1938 |